UNITED STATES PATENT OFFICE.

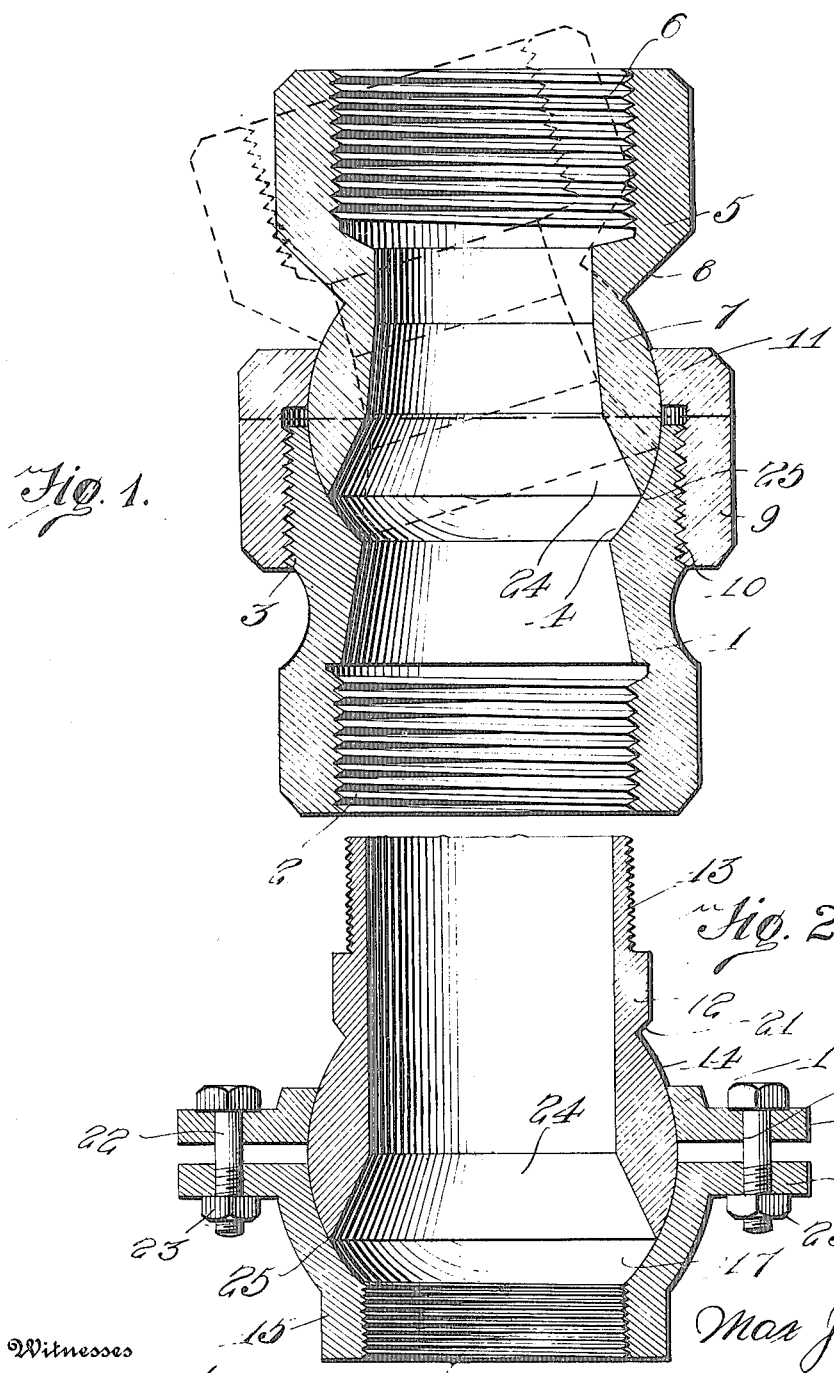

MAX J. MILZ, OF TAFT, CALIFORNIA.

PIPE-JOINT.

1,187,642.  Specification of Letters Patent.  Patented June 20, 1916.

Application filed October 17, 1914. Serial No. 867,149.

*To all whom it may concern:*

Be it known that I, MAX J. MILZ, a citizen of the Austro-Hungarian Empire, residing at Taft, in the county of Kern and State of California, have invented certain new and useful Improvements in Pipe-Joints, of which the following is a specification.

My invention relates to new and useful improvements in a pipe joint and more particularly to an adjustable joint.

The primary object of the invention is the provision of a joint or coupling whereby pipes may be connected or secured together at various angles.

A further object of the invention is the provision of means for holding the joint in its adjusted position.

A still further object of the invention is the provision of a joint in which it is not necessary to use packing.

With these and other objects in view the invention consists in the novel details of construction and arrangement of parts which will be more clearly understood from the following description and drawings, in which, Figure 1 is a vertical sectional view. Fig. 2 is a vertical section of a slightly modified form of the invention.

Referring more particularly to the drawings, 1 designates a sleeve having one end provided with interior threads 2 and the opposite end provided with exterior threads 3 and an interior concaved seat 4. A second sleeve or coupling member 5 having the interior threads 6 is provided with the ball extension 7 which is adapted to be received on the seat 4 of the other sleeve 1 and where the ball head 7 is formed on the sleeve it is so constructed as to form a straight shoulder 8, the purpose of which will be presently described. A nut 9 having interior threads 10 is adapted to be received on the threads 3 of the sleeve 1 and this nut 9 is provided with a flange 11 forming a central opening and the end of the flange is curved in such a manner as to fit the ball 7. The opening formed by the flange 11 is of less diameter than the ball 7 and the nut will therefore be held upon the ball 7.

In assembling the various parts of the joint the ball 7 of the sleeve 5 is received on the seat 4 of the sleeve 1 and by threading the nut 9 onto the threaded end 3 of the sleeve 1 the two sleeves will be connected. It will be seen that the two sleeves may be arranged at any angle desired and the nut further turned so as to securely hold them in their adjusted position. The shoulder 8 on the sleeve 5 limits the movement of the sleeves and it is adapted to engage the flange 11 of the nut 9 when the parts are at the farthermost angle.

In Fig. 2 I have shown a slightly modified form of the invention which comprises a sleeve 12 having one end provided with the exterior threads 13 and the opposite end provided with a ball head 14. A second sleeve is indicated, at 15, and has one end interiorly threaded, as shown at 16, and the opposite end formed with the concaved seat 17 and the outwardly extending flange 18 having a plurality of perforations therethrough. A ring 19 having a flange 20 with perforations therein is received on the ball 14 and the interior of the ring is curved so as to conform to the curvature of the ball. The sleeve 13 is provided with a shoulder 21 which limits the movement of the parts. Threaded bolts 22 pass through the openings in the flanges 18 and 20 for securing the members together and nuts 23 are received on the threaded ends of the bolts.

As is shown in both the preferred and modified forms of the invention the ball-shaped head on the sleeve 5 is beveled interiorly, as shown at 24, and forms a sharp edge, illustrated at 25. This edge will be of particular advantage inasmuch as it will cut any rust or sediment which may form on the concaved seat. In adjusting the sleeves if this sharp edge was not provided sediment of various characters might form on the seat and prevent the ready adjustment of the sleeves. The sharp edge will easily cut any sediment from the seat as the two sleeves are adjusted to the various angles.

It will be seen that the operation in the modified form of the invention is substantially the same as that in the preferred form and that by loosening the nuts 23 the ring is loosened from the ball and the sleeves may be adjusted to any angle. By tightening the nuts the parts are held in their adjusted position and the shoulders 21 on the sleeve 12 will limit the movement of said sleeve.

It will be seen that I have provided a joint whereby meeting ends of pipes may be connected when they come together at various angles. It will be seen that in a joint of this construction it is not necessary to use any packing whatsoever as by having the members so curved as to tightly fit one another there is no danger of leakage when the parts are drawn together.

Having fully described the invention what I claim as new and desire to secure by Letters Patent is:—

1. In a pipe coupling, a sleeve having a threaded chamber on one end and a concaved seat on the other, the inner wall between said chamber and seat being divergent toward the chamber, a second sleeve provided with a threaded chamber and a ball shaped head received within said seat, the inner wall of said head being inclined toward the outer wall thereof, the exterior side wall of the second chamber being inclined toward the head, and a collar adjustably mounted on the first sleeve and engaging the head, the inclined side wall of the second sleeve engaging the collar to limit the movement of said second sleeve.

2. In a pipe coupling, a sleeve having a threaded chamber on one end and a concaved seat on the other, the inner wall between said chamber and seat being divergent toward the chamber, a second sleeve provided with a threaded chamber and a ball shaped head received within said seat, the inner wall of said head being inclined toward the outer wall thereof, the exterior side wall of the second chamber being inclined toward the head, and a collar adjustably mounted on the first sleeve and engaging the head, the inclined side wall of the second sleeve engaging the collar to limit the movement of said second sleeve, whereby the inclined inner walls are alined when either of the sleeves is tilted to its utmost position.

In testimony whereof I affix my signature in presence of two witnesses.

MAX J. MILZ.

Witnesses:
J. WALTER KEY,
FRED P. BOLSTAD.